United States Patent
Brunner et al.

(10) Patent No.: US 8,039,804 B2
(45) Date of Patent: Oct. 18, 2011

(54) METHOD FOR EVALUATING AN IMAGE DATASET ACQUIRED BY A RADIATION-BASED IMAGE ACQUISITION DEVICE

(75) Inventors: Thomas Brunner, Nürnberg (DE); Christoph Köhler, Forchheim (DE); Bernd Schreiber, Forchheim (DE)

(73) Assignee: Siemens Aktiengesellschaft, Munich (DE)

( * ) Notice: Subject to any disclaimer, the term of this patent is extended or adjusted under 35 U.S.C. 154(b) by 408 days.

(21) Appl. No.: 12/381,494

(22) Filed: Mar. 12, 2009

(65) Prior Publication Data
US 2009/0236511 A1  Sep. 24, 2009

(30) Foreign Application Priority Data
Mar. 20, 2008 (DE) .......................... 10 2008 015 291

(51) Int. Cl.
*G01T 1/20* (2006.01)
*G01N 23/00* (2006.01)

(52) U.S. Cl. .......... 250/363.01; 250/369; 378/4; 378/21

(58) Field of Classification Search ............. 250/363.01, 250/369; 378/4, 21
See application file for complete search history.

(56) References Cited

U.S. PATENT DOCUMENTS 5,406,479 A * 4/1995 Harman ............................ 378/7
6,804,325 B1 * 10/2004 Smith ............................. 378/37

FOREIGN PATENT DOCUMENTS

DE  10 2006 040 852 A1  3/2008

OTHER PUBLICATIONS

M. Zellerhoff, B. Scholz, E.-P. Rührnschopf, T. Brunner; "Low contrast 3D reconstruction from C-arm data", Proceedings of SPIE, Medical Imaging 2005, vol. 5745, pp. 646-655.

* cited by examiner

*Primary Examiner* — Constantine Hannaher
*Assistant Examiner* — Mindy Vu

(57) ABSTRACT

The invention relates to a method for evaluating an image dataset obtained by a radiation-based image acquisition device. A scatter background dataset is determined as a function of the image data. The image dataset is corrected pixel by pixel by multiplying the image dataset with the inverse of a function dependent on the quotient of the scatter background data and the image data at a respective pixel. The function is a nonlinear, smooth function determined by a coefficient and having positive derivatives. The absolute value of the function is one for the value zero. The image acquisition parameter dependent coefficient is determined by an optimization process.

13 Claims, 2 Drawing Sheets

METHOD FOR EVALUATING AN IMAGE DATASET ACQUIRED BY A RADIATION-BASED IMAGE ACQUISITION DEVICE

CROSS REFERENCE TO RELATED APPLICATIONS

This application claims priority of German application No. 10 2008 015 291.9 filed Mar. 20, 2008, which is incorporated by reference herein in its entirety.

FIELD OF THE INVENTION

The invention relates to a method for evaluating an image dataset acquired by means of a radiation-based image acquisition device.

BACKGROUND OF THE INVENTION

Some of the image data obtained using a radiation-based image acquisition device is basically the scattered radiation. This background is produced when radiation is not absorbed at the examination subject but scattered in the direction of the detector.

It is therefore customary to correct the resulting image datasets in respect of this scattered radiation. For this purpose, in a first step, a scatter background dataset is first determined, the scatter-component-describing data from previous examinations, e.g. from a database, or even from simulations, also being taken into account in addition to the image data itself. Modifications or calculations on the basis of mathematical formulae are also possible. These estimates are well known in the prior art, see e.g. the article by Zellerhoff et al. (Zellerhoff, Scholz, Rührnschopf, Brunnner, "Low contrast 3D-reconstruction from C-arm data", Proceedings of SPIE, Vol. 5745) which also describes the following subsequent procedure.

As the scatter background dataset is first determined pixel by pixel, it is usual to smooth the entire dataset thereafter by a filter.

Usual methods for estimating the scatter background dataset use an iterative approach, which means that the accuracy of the estimate increases with the number of iterations. Because of the high computational load and the associated time requirement, only a very small number of iteration steps are used in actual methods.

If the scatter background dataset is first determined, a correction step takes place in which the image dataset is corrected pixel by pixel on the basis of the scatter background dataset. For this purpose two variants are basically known. On the one hand, there is subtractive correction $$P = T - S,$$

where P is the corrected normalized intensity distribution, T the normalized measured intensity distribution and S the estimated scatter distribution according to the scatter background dataset. The disadvantage of this variant is that—as the scatter background dataset is an estimate—negative values may also occur in P which are self-evidently meaningless. This can lead to massive problems for executing the algorithm.

A second variant, namely multiplicative correction, is therefore frequently used. This follows the formula $$P = \left(\frac{T}{T+S}\right).$$

Although this variant has the advantage of always producing positive results, an underestimate of the correction occurs for large ratios, essentially one or greater, of the scatter background data to the image data.

When using this second method, so-called horizontal artifacts occur particularly frequently. This means that e.g. in the case of medical imaging, vessels or organs running in the horizontal direction appear incorrectly or not at all in the 3D reconstruction determined from the corrected image dataset, the horizontal direction being the direction of propagation. These artifacts can be explained by the fact that, in the case of these horizontal paths, extremely heavy attenuation of the signal necessarily occurs at the corresponding pixels, so that a weak signal is overlaid with in some cases greater scatter effects. Ratios of scatter background to actual image signal are often in the range of up to 1.5, but higher values are also possible. On the one hand, this makes estimation difficult, and, on the other, multiplicative correction does not yield correct values here.

Such incorrect reconstruction of radiation-based images, e.g. CT scans, may result in dangerous misdiagnoses, as such high ratios of scatter background to image signal may often arise even in the case of aneurisms for example.

SUMMARY OF THE INVENTION

The object of the invention is therefore to provide an evaluation method which allows better correction of scatter effects and appreciably reduces the number of horizontal artifacts as well as increasing the quality of three-dimensional images.

To solve this problem it is inventively provided for a method comprising the following steps for correcting scatter effects:

determining a scatter background dataset as a function of the image data, correcting the image dataset pixel by pixel on the basis of the scatter background dataset by multiplying the image dataset by the inverse of a function depending on the quotient of the scatter background data and the image data at the particular pixel.

A nonlinear, smooth function determined by at least one coefficient and having positive derivatives is used as the function, the absolute value of which is one for the value zero. The image acquisition parameter dependent coefficient is or has been determined by an optimization process.

By selecting a more general function determined by one or more coefficients, the invention therefore achieves a generalization of the known multiplicative correction, enabling multiplicative correction to be adapted to the specific requirements for particular image acquisition parameters and particularly even to individual image datasets. By skillfully selecting the coefficient or coefficients it is therefore possible, even in regions where the quotient of the scatter background data and the image data is very large, to determine the actual image signal and therefore to achieve even in these image regions a sufficiently high contrast so that horizontal artifacts are prevented and the image quality e.g. of a 3D reconstruction is substantially increased. Moreover, specially selecting the function as a smooth function with a value of one for a quotient of zero so that all the derivatives are positive ensures that the advantage of multiplicative correction, namely that positive corrected image data is always obtained, is retained.

With the method according to the invention, a flexible tool is created which considerably improves the evaluation of image datasets and, in particular, prevents horizontal artifacts from occurring or at least significantly reduces the number thereof.

In another embodiment of the invention, a polynomial can be used as the function. Because of their versatility and ease of implementation, polynomials are particularly well suited to carrying out the optimization process and the correction. The properties of the function which are required by the method according to the invention can be ensured due in particular to the fact that the coefficients of the polynomial are positive.

Alternatively it is also possible to use a spline as the function, i.e. a smooth function made up of a plurality of polynomials. Here again, to obtain the required properties, it is advisable that the coefficients of the sub-polynomials of the spline are positive.

The optimization process for obtaining values for the coefficients of the function can be carried out in particular even during manufacture or as early as the design stage of an image acquisition device, sets of coefficients allowing optimum correction then being available for all the possible image acquisition parameters or for ranges of image acquisition parameters. It is of course also basically conceivable to determine suitable coefficients for the image dataset currently present. In all these cases, optimization can be accomplished, for example, by tests using the wealth of experience acquired by an expert. Different coefficients are used for the correction, whereupon the resulting corrected image data is compared and/or assessed in particular by visual inspection.

It has been found particularly advantageous, however, if simulation image datasets and/or actual image datasets are used as part of the optimization process, whereupon optimization of the coefficient in respect of contrast is carried out on the basis of a starting value, comparing corrections of the scatter effects with different coefficients. In this variant of the method, image datasets are accordingly first produced by simulation or actual acquisition which are used to determined the coefficients for the specific image acquisition parameters which are self-evidently the basis of the actual image datasets and/or the simulation image datasets. Simulation methods which determine in particular the scattering of the radiation at predefined three-dimensional structures are known in the prior art and offer the additional advantage that the underlying three-dimensional structure is known and an assessment of the result using particular coefficients can therefore take place directly, i.e. possibly even automatically. However, such an assessment is also conceivable in the case of actual image datasets, as e.g. missing vessel sections or their presence can be observed for other coefficients. Of course, it must also be observed that no additional or new artifacts are produced by the correction.

In the optimization step following generation of the actual or simulation image datasets, the method proceeds from the starting values. These can be determined on the basis of an expert's wealth of experience. However, an advantageous embodiment of the method provides that, to determine the starting value for the coefficient or coefficients, a histogram of the quotient of the scatter background data and the image data of the simulation datasets and/or actual image datasets is taken into account. Such a histogram provides a simple means of assessing, particularly also automatically, in which regions, in particular of high values for the quotients, a precise correction, particularly therefore a correction function with a large slope, is required in order to achieve a sufficient contrast to enable the actual image signal to be made out. The starting value can then be selected automatically in respect of these regions or on the basis of an operator experience.

In the optimization step, proceeding from the starting values, the most suitable coefficients for the particular image acquisition parameters (for example, focal length, radiation intensity, etc.) are now selected e.g. automatically on the basis of known optimization algorithms, but possibly also by visual inspection. Semi-automatic methods are also conceivable in which the optimization can be monitored and possibly improved by the experience acquired by an operator. Algorithms such as parameter searchers for such optimization problems are basically well known.

The number of actual or simulation image datasets used in the method segment for determining the coefficients should be in the range 8-12, in particular 10. In another embodiment of the invention it is also conceivable, to complete the optimization process, to perform another check of the optimized coefficients on actually acquired image datasets of the image acquisition device. By this means a test can be carried out on the actual unit.

In particular, a CT image dataset can be used as the image dataset, but the method is also applicable to other radiation-based image acquisition devices.

In addition to the method, the invention also relates to an image acquisition device with an evaluation unit, designed to carry out the method according to the invention. If the method according to the invention is implemented in the evaluation unit of an image acquisition device in the as-supplied condition, the advantages of the method according to the invention can be used immediately.

BRIEF DESCRIPTION OF THE DRAWINGS

Further advantages and details of the present invention will emerge from the exemplary embodiments described below and the accompanying drawings in which.

DETAILED DESCRIPTION OF THE INVENTION

Figure 1:
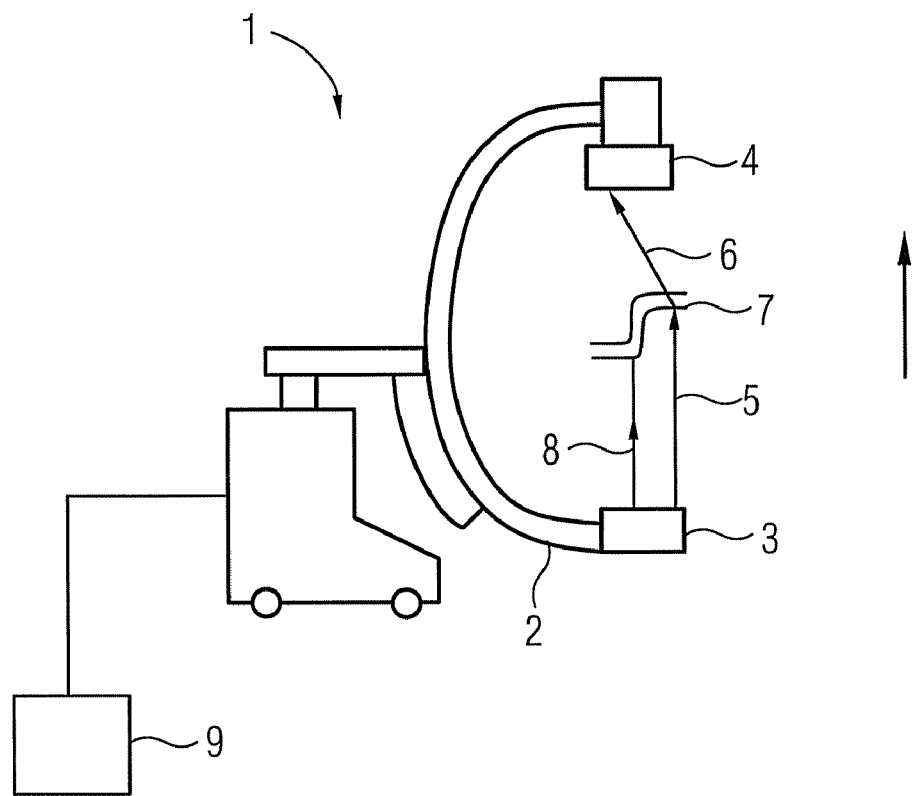
FIG. 1 shows an image acquisition device according to the invention.

FIG. 1 shows the schematic diagram of an image acquisition device 1 according to the invention, in this case a C-arm CT device. It comprises a C-arm 2 opposite which are disposed a radiation source 3 and a radiation detector 4. Image acquisition may now produce scatter effects, as indicated by the beams 5 and 6 shown by way of example. However, the beam 5 is scattered at a schematically represented object 7 such that the corresponding scattered beam 6 nevertheless reaches the detector 4 where a scatter background signal is measured accordingly. Normally the ratio of scatter background signal to actual image signal is relatively small. This changes, however, if an object to be scanned runs, for example, horizontally (i.e. in the radiation direction), as indicated centrally in the case of the object 7. Then the largest part of the radiation 8 is absorbed, so that only a very small intensity is measured as the image signal. The consequence of this, however, is that the quotient of the scatter background signal and the image signal becomes correspondingly large. In such cases it is difficult to separate the two signals and achieve a sufficient contrast.

The image acquisition device 1 also incorporates an evaluation unit 9 suitable for implementing the method according to the invention, with the aid of which such horizontal artifacts possibly occurring can essentially be prevented.

Figure 2:
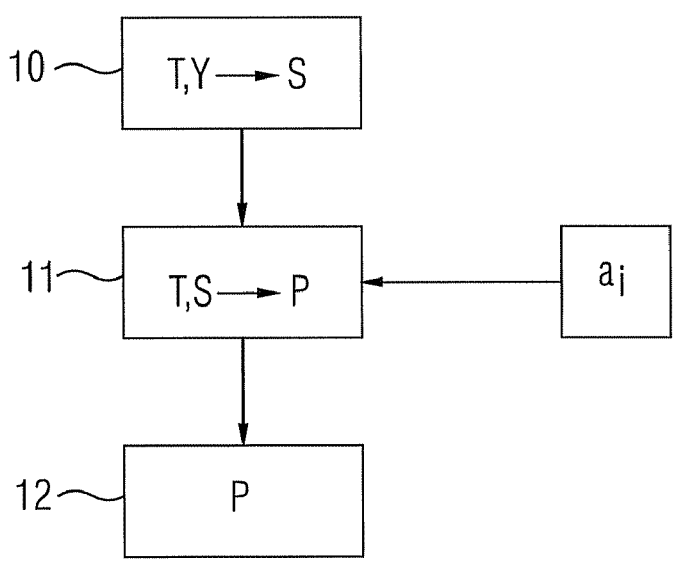
FIG. 2 shows a flow chart of the method according to the invention.

A flow chart of the automatically executed method according to the invention is shown in FIG. 2. In a first step 10 the scatter background dataset S is calculated as a function of the image data, here and hereinafter denoted by T. Additional information Y is included which is coupled in via a database or using a special formula. The scatter background dataset S is determined pixel by pixel, after which a smoothing filter is usually employed. An iterative procedure is normally used wherein, however, only a small number of iteration steps are executed because of the high computational effort. The determination or estimation of the scatter background is well known in the prior art and will not therefore be described in greater detail here.

In a second step 11 the image dataset T is multiplicatively corrected to produce a corrected image dataset P. This is carried out using the formula $$P = \frac{T}{f(x)},$$

where $$x = \frac{S}{T},$$

i.e. the quotient of the scatter background datum and the image datum at the particular pixel. In the known prior art, $f(x)=1+x$ is used as the function. This linear function results in the known multiplicative correction which, however, is imprecise in the case of large values for x. According to the invention, a generalized function is used—a polynomial in the present example, i.e.

$$f(x) = 1 + \sum_{i=1}^{n} a_i x^i,$$

where, for the coefficients, $a_i \geq 0$ applies for all i. The nth degree polynomial described is therefore a smooth function with $f(0)=1$ where all the derivatives are positive.

The coefficients $a_i$ must now be selected, or have been selected, such that even in the high x value regions occurring in the case of these image acquisition parameters, i.e. in particular $x \geq 1$, the correction produces a sufficient contrast in the corrected image dataset P. In this way horizontal artifacts in the reconstructed volume can be prevented. Note that f produces a meaningful, positive correction even in the case of particularly high x values, e.g. 100 or 1000, that may occasionally occur, so that the method is also sufficiently robust.

In the present exemplary example, the coefficients $a_i$ were determined in advance for the image acquisition device 1. For this purpose actual image datasets and simulation image datasets were generated, wherein a starting value for an optimization algorithm for optimizing $a_i$ was first established. To do this, from the ten image datasets used for the optimization process a histogram of the quotients x was drawn up which shows the regions far from zero in which a cluster of large x values occurs, necessitating particularly precise correction. On this basis, a starting value or starting values can therefore be determined using the wealth of experience of an operator or automatically. Around this starting value, different correction runs are now carried out as described above using varying coefficients, whereupon the results are assessed and/or compared. This optimization problem can be solved automatically by parameter searching, but also semi-automatically or manually by visual assessment by an operator. It should be noted that as few horizontal artifacts as possible appear, but no new artifacts occur as a result of the correction. The resulting optimized coefficients $a_i$ of the polynomial f can now continue to be used in the image acquisition device 1 for corresponding image acquisition parameters. However, after the optimization process it is also possible to carry out a number of test runs using actually acquired image datasets.

Figure 3:
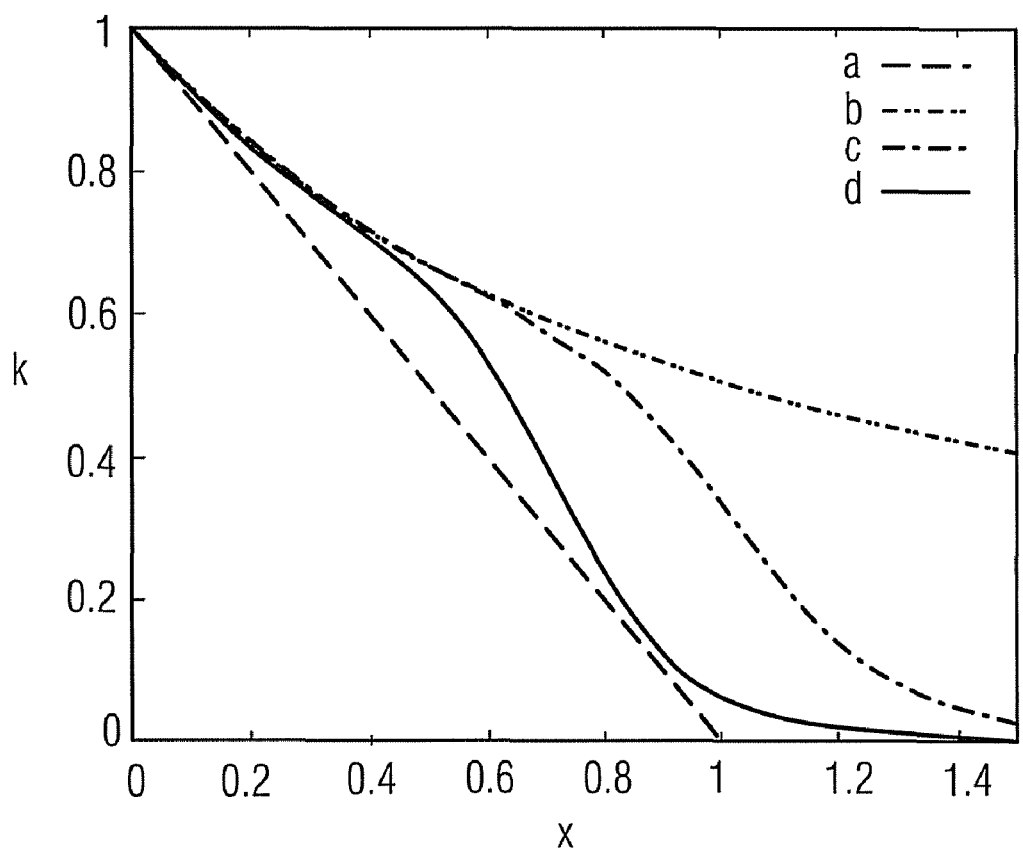
FIG. 3 shows a graph for comparing different correction functions.

A comparison of functions f used in the method according to the invention and methods known from the prior art is shown in FIG. 3. The abscissa shows values for x, the ordinate the correction value k. The graph a shows subtractive correction. The upper graph b shows multiplicative correction ($f(x)=1+x$). The graphs c and d show the correction value for different functions in the method according to the invention, namely $f(x)=1+x+x^9$ and $f(x)=1+5x^7+5x^8+5x^9$. The curves c and d can be seen to lie between the curves a and b, but always above zero. The two curves c and d show an optimized correction behavior for higher values of x. In the method according to the invention, the advantages of multiplicative correction are therefore combined with a very much better correction for larger values of x, making better contrast possible and therefore preventing horizontal artifacts.

In step 12 (FIG. 2) further evaluation takes place, e.g. determination of a 3D reconstruction image from the corrected image dataset c. Note that correction of the image dataset can also inventively take place as part of a further processing step. Thus it has been found advantageous to calculate the corrected line integral $p=-\log(T)$ which is then given by $$P=\log(f)-\log(T).$$

The invention claimed is:

1. A method for correcting an image dataset acquired by a radiation-based image acquisition device, comprising:
   determining a scatter background dataset as a function of the image dataset;
   defining a coefficient by an optimization process, the coefficient being dependent on an image acquisition parameter and having a positive derivative;
   generating a nonlinear and smooth function by the coefficient, the function being dependent on a quotient of the scatter background dataset and the image dataset at a respective pixel and having an absolute value of one for the value zero; and
   correcting the image dataset pixel by pixel by multiplying the image dataset with an inverse of the function.

2. The method as claimed in claim 1, wherein the function is a polynomial.

3. The method as claimed in claim 2, wherein coefficients of the polynomial are positive.

4. The method as claimed in claim 1, wherein the function is a spline.

5. The method as claimed in claim 1, wherein a simulation image dataset is generated for the optimization process.

6. The method as claimed in claim 5, wherein the optimization process is performed based on the simulation image dataset or the image dataset acquired by the image acquisition device.

7. The method as claimed in claim 6, wherein a plurality of different coefficients are optimized in respect of a contrast proceeding from a starting value.

8. The method as claimed in claim 7, wherein a scatter effect correction is compared with the different coefficients.

9. The method as claimed in claim 7, wherein the optimized coefficients are checked in the image dataset acquired by the image acquisition device.

10. The method as claimed in claim 7, wherein the starting value is determined by a histogram of the quotient of the scatter background dataset and the image dataset acquired by the image acquisition device.

11. The method as claimed in claim 7, wherein the starting value is determined by a histogram of a quotient of the scatter background dataset and the simulation image dataset.

12. The method as claimed in claim 1, wherein the image dataset is a CT image dataset.

13. An image acquisition device, comprising:
a radiation source that emits radiation beams;
a radiation detector that detects an image dataset; and
an evaluation unit that:
    determines a scatter background dataset as a function of the image dataset;
    defines a coefficient by an optimization process, the coefficient being dependent on an image acquisition parameter and having a positive derivative;
    generates a nonlinear and smooth function by the coefficient, the function being dependent on a quotient of the scatter background dataset and the image dataset at a respective pixel and having an absolute value of one for the value zero; and
    corrects the image dataset pixel by pixel by multiplying the image dataset with an inverse of the function.

* * * * *